United States Patent [19]

Shino et al.

[11] 3,926,277

[45] Dec. 16, 1975

[54] VEHICLE DRAWN BY SUCTION AGAINST THE SURFACE OF TRAVEL

[75] Inventors: Makoto Shino, Asaka; Mitsuo Saito, Tokyo, both of Japan

[73] Assignee: Honda Giken Kogyo Kabushiki Kaisha, Tokyo, Japan

[22] Filed: Apr. 23, 1974

[21] Appl. No.: 463,377

[30] Foreign Application Priority Data
Apr. 25, 1973 Japan.............................. 48-46073

[52] U.S. Cl.................................. 180/115; 15/340
[51] Int. Cl.²......................................... B60B 37/00
[58] Field of Search....... 180/1 FU, 1 VS, 115, 119; 46/243 AV; 15/340

[56] References Cited
UNITED STATES PATENTS

| | | |
|---|---|---|
| 1,698,482 | 1/1929 | Nicin.................................. 180/115 |
| 3,209,849 | 10/1965 | Gondert.............................. 180/115 |
| 3,232,633 | 2/1966 | Feher................................ 180/115 X |
| 3,268,023 | 8/1966 | Di Napoli........................... 180/115 |
| 3,628,625 | 12/1971 | Boyles................................ 180/115 |
| 3,810,515 | 5/1974 | Ingro................................. 180/1 VS |

FOREIGN PATENTS OR APPLICATIONS

| | | |
|---|---|---|
| 526,433 | 6/1956 | Canada.............................. 180/1 VS |

*Primary Examiner*—Robert R. Song
*Assistant Examiner*—Terrance L. Siemens
*Attorney, Agent, or Firm*—Waters, Schwartz & Nissen

[57] ABSTRACT

A vehicle having a hollow body opening at the bottom and adapted to be drawn under suction against the surface over which the vehicle travels. It can travel stably over any surface such as a wall surface, a slope surface or a ceiling surface not to say of a floor surface and can serve a wide variety of purposes including amusements and transportation purposes.

4 Claims, 7 Drawing Figures

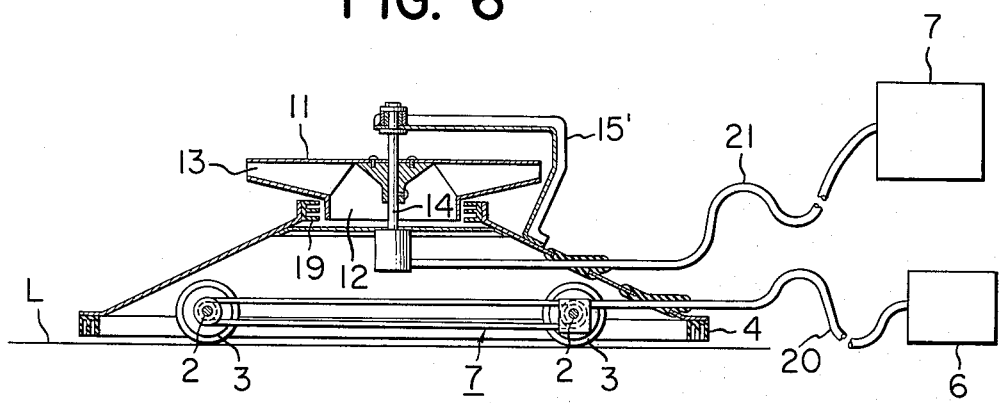
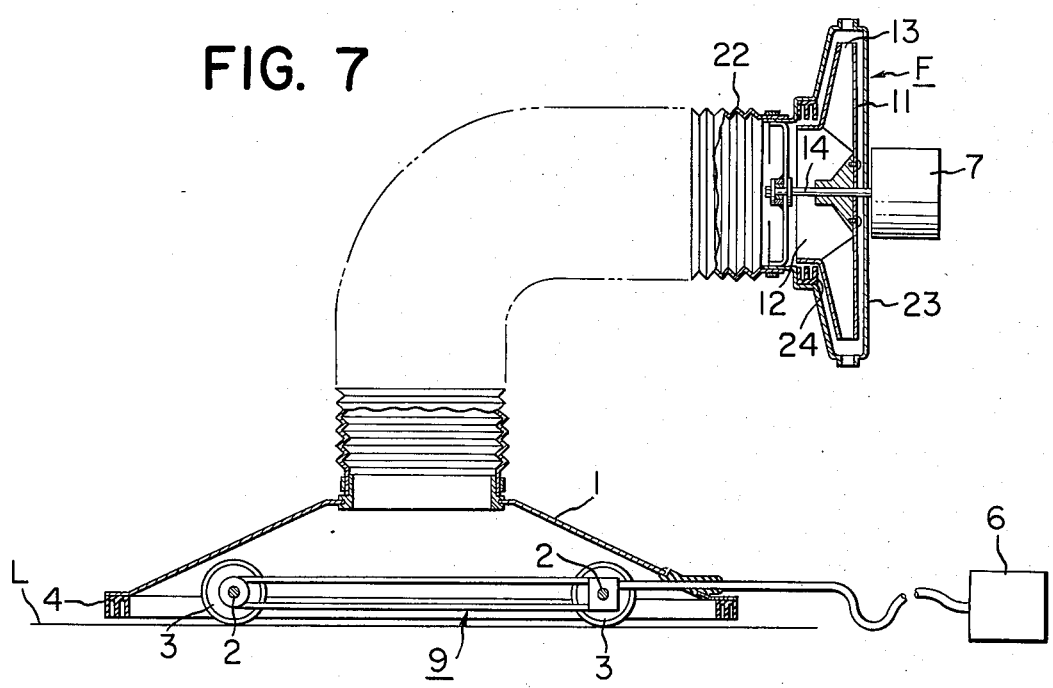

VEHICLE DRAWN BY SUCTION AGAINST THE SURFACE OF TRAVEL

BACKGROUND AND SUMMARY OF THE INVENTION

This invention relates generally to vehicles and more particularly to those of a novel type which can serve a wide variety of purposes including amusements and transportation purposes as a toy car or a luggage carrier.

The present invention has for its object the provision of a vehicle which can travel freely over any horizontal, vertical or inclined surfaces such as a floor surface, a wall surface, a steep slope surface or a ceiling surface, having a hollow body supported by wheel means on the surface and adapted to be held thereagainst under a vacuum produced within the hollow interior of the body.

Another object of the present invention is to provide a vehicle of the character described which is so arranged and constructed as to have its center of gravity in the central region of the vehicle body for good maneuverability.

A further object of the present invention is to provide a vehicle of the character described which includes a body of lightweight design and can travel over any surface while being securely held thereagainst under vacuum with limited power requirements.

Yet another object of the present invention is to provide a vehicle of the character described which includes for evacuating the interior space of the body a fan unit formed separate therefrom and can be used also as a suction device such as a vacuum cleaner.

These and other objects, features and advantages of the present invention will become apparent from the following description when taken in conjunction with the accompanying drawings.

BRIEF DESCRIPTION OF THE DRAWINGS

In the drawings:

FIG. 6 is a view similar to FIGS. 2 and 5, showing a further preferred embodiment of the present invention; and FIG. 7 is a view similar to FIGS. 2, 5 and 6, showing yet another preferred embodiment of the present invention.

DESCRIPTION OF THE PREFERRED EMBODIMENTS

Figure 1:
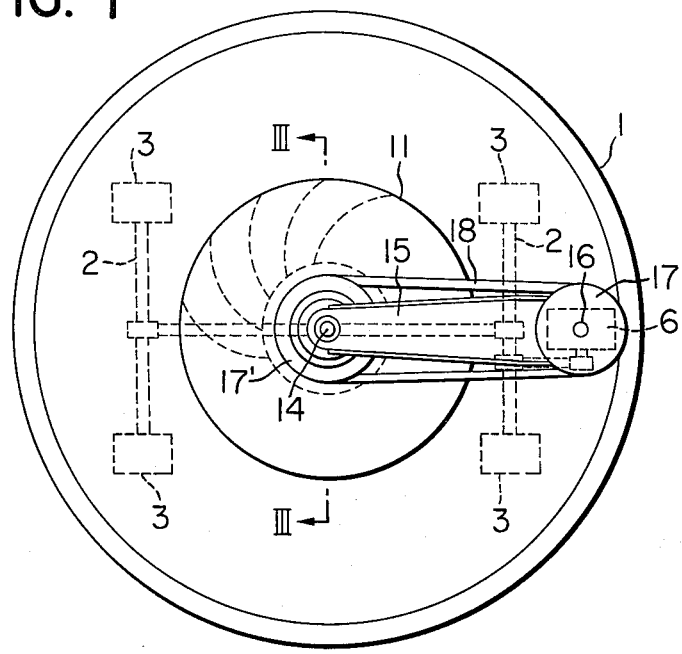
FIG. 1 is a plan view of a preferred embodiment of the present invention.
Figure 2:
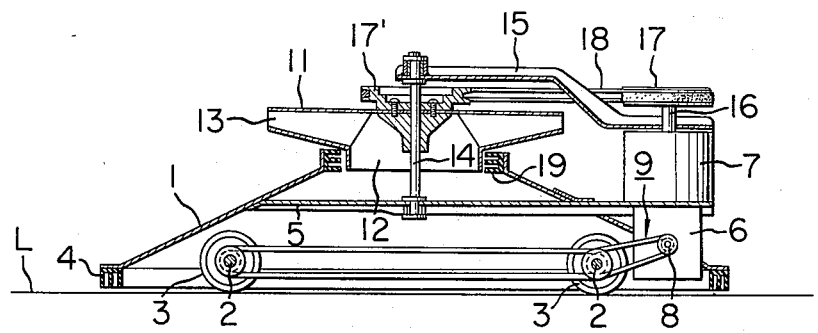
FIG. 2 is a side elevation, in longitudinal cross section, of the embodiment.
Figure 3:
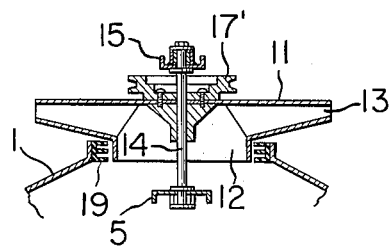
FIG. 3 is a cross-sectional view of the same, taken along the line III—III in FIG. 1.

Referring to the drawings and first to FIGS. 1 to 3, which illustrate a first embodiment of the present invention, reference numeral 1 indicates a vehicle body frustoconical in shape and formed hollow to define an interior space opening at the bottom. Rotatably supported on the lower portion of the body 1 at the front and rear thereof are a pair of wheel axles 2 with travelling wheels 3 mounted within the vehicle body 1 on the opposite ends of the axles 2.

Formed on the vehicle body 1 around the bottom periphery thereof is a depending member 4 which is made of a soft material such as rubber and serves as a labyrinth packing. The vehicle body 1 is supported by travelling wheels 3 in a manner so that only a slight space is defined between the bottom edge of the depending member 4 and the level of surface L over which the vehicle travels. Horizontally mounted within the vehicle body 1 is a frame 5 which supports at one end wheel drive means 6 and fan drive means 7, the latter of which will be described later. The wheel drive 6 includes an output shaft 8 which is connected with the wheel axles 2 through an appropriate power transmission 9 for driving travelling wheels 3. The power transmission 9 may take the form of a belt transmission, a chain transmission or a propeller shaft transmission, as desired.

Arranged in the top opening of the frustoconically shaped vehicle body 1 is a fan 11 having a suction port 12 opening into the body 1 and an exhaust or delivery port 13 opening to the atmosphere. The fan 11 includes a fan shaft 14 which is rotatably mounted at the bottom end on the frame 5 and at the top on a stay member 15 extending forwardly from the fan drive means 7, which includes an output shaft 16 connected with the fan 11 through the intermediary of a pulley 17 mounted on the output shaft 16, a pulley 17' mounted on the fan shaft 14 and a drive belt 18 entrained over the two pulleys to serve the purpose of driving the fan 11. Also, a labyrinth packing 19 is provided around the top opening of the vehicle body 1 to serve the purpose of preventing air leakage around the outer periphery of the suction port 12 of fan 11 into the vehicle body 1.

Description will next be made of the operation of the vehicle shown in FIGS. 1 to 3. As the wheel and fan drive means 6 and 7 are started, the travelling wheels 3 are driven to turn and at the same time the air pressure in the hollow interior of the vehicle body 1 is gradually reduced until the body 1 is drawn against the surface L under the suction or the pressure difference between the external atmosphere and the hollow space in the body 1. The suction is of a magnitude sufficient to hold the vehicle body against any steep slope surface or even against a vertical wall surface or a ceiling surface and enables the vehicle to travel freely over such surface.

Figure 4:
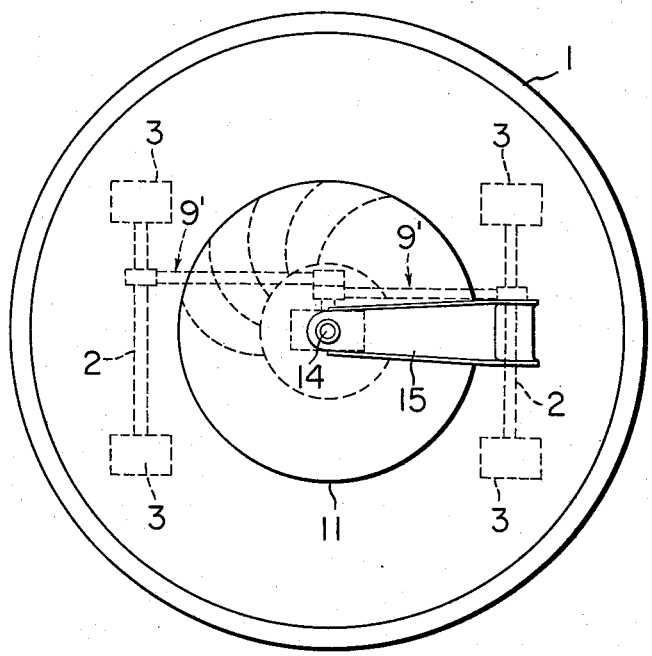
FIG. 4 is a plan view of another preferred embodiment of the present invention.
Figure 5:
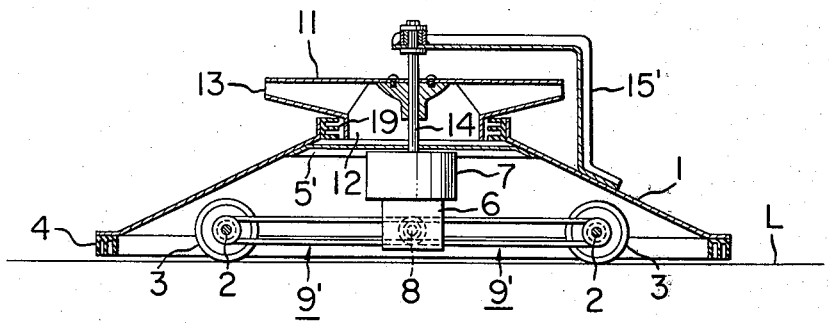
FIG. 5 is a view similar to FIG. 2, of the embodiment shown in FIG. 4.

Reference will next be made to FIGS. 4 and 5, which illustrate another embodiment of the present invention, in which both wheel and fan drive means are of particular arrangement and mounting structure. As shown, the wheel and fan drive means 6 and 7 are arranged within the vehicle body 1 in the central region thereof and mounted on a frame 5' transversely secured to the body 1. The output shaft 8 of wheel drive means 6 is connected with wheel axles 2 through the medium of respective power transmissions 9' while the output shaft of fan drive means 7 is supported by a stay 15', which extends from the vehicle body 1, and is directly connected with the fan shaft 14.

In this embodiment, with the wheel and fan drive means 6 and 7 and the fan 11 itself arranged in the central region of the vehicle body 1, the center of gravity of the vehicle as a whole can readily be brought substantially in coincidence with the center of action of the force of suction caused by the fan 11. This obviously enables the vehicle to travel in a well-balanced state and makes it readily steerable in any desired direction.

FIG. 6 illustrates a vehicle embodying another aspect of the present invention, in which the wheel or fan drive means or both are arranged remote from the vehicle body. As shown, in this embodiment, both the wheel and fan drive means 6 and 7 are arranged remote from the body 1, having respective output shafts connected with the wheel axles 2 and fan shaft 14 through the medium of respective flexible power transmitting cables 20 and 21. This arrangement obviously enables substantial reduction in weight of the vehicle and in power required of the drive means 6 and 7 while at the same time enabling remote control of the vehicle.

A further aspect of the present invention will next be described with reference to FIG. 7, which illustrates an embodiment of the invention including a fan unit F, which is formed separate from the vehicle body 1 and includes at least a fan 11 and drive means 7 therefor respectively corresponding to the components 7 and 11 of the embodiment shown in FIGS. 1 to 3. The fan unit F is connected with the vehicle body 1 by a flexible, extensible air duct 22, which is connected at one end to the open top end of the vehicle body 1 and at the other end to the inlet end of the fan casing 23 of the unit F. As shown, fan 11 is accommodated in the fan casing 23 and mounted on a shaft 14, which is supported by the casing 23 and extends therethrough for connection with a fan drive 7 arranged outside of the casing 23. The suction port 12 of fan 11 is directed toward the adjacent open end of the air duct 22 and the exhaust or delivery port 13 of fan 11 is disposed opposite to the outlet port of fan casing 23, as shown. The fan casing 23 is provided circumferentially opposite to the tubular inlet end of fan 11 with labyrinth packing means 24. As shown, the wheel drive means 6 in this embodiment is formed separate from the vehicle body 1 for remote control, but may be mounted, if desired, directly on the body 1, as in the case of the first embodiment shown in FIGS. 1 to 3.

The embodiment of FIG. 7 is advantageous in that the vehicle can be reduced in weight and that it can be used as a suction device such as a vacuum cleaner as dust or the like drawn into the vehicle body 1 under vacuum during travel of the vehicle is effectively delivered out of the body 1 through the air duct 22.

As will readily be appreciated from the foregoing, the vehicle of the present invention can travel with its body 1 continuously held close to the surface over which the vehicle travels and thus is capable of running in a stable manner over any surfaces including a floor surface, a steep slope surface, a vertical wall surface and a ceiling surface. Because of such capability, the vehicle of the present invention can serve a wide variety of purposes and is not only very attractive as a toy or a car for amusements but is highly valuable as transportation means that can transport luggages or the like onto the ceiling or to such high places as cannot be reached by any ladder vehicle.

According to another aspect of the present invention, the vehicle of the character described can be so arranged and constructed that the center of action of the force of fan suction and the center of gravity of the whole vehicle are both placed in the central region of the vehicle body 1 and this enables the vehicle to run in a stable state with good maneuverability irrespective of the surface over which it travels as it is not subjected to any bias load tending to cause yawing.

According to the third aspect of the present invention, the wheel or fan drive means or both are arranged separate from the vehicle body and in this manner the vehicle itself can be effectively reduced in weight and in power requirement.

Finally, according to the fourth aspect of the present invention, a fan unit including at least a fan and drive means therefor is arranged apart from the vehicle body with the suction port of the fan held in fluid communication with the top opening of the vehicle body by means of a flexible, extensible air duct so that the vehicle itself is further reduced in weight and can be utilized as a vacuum cleaner or other suction device as well.

While particular embodiments of the present invention have been shown and described, it will be apparent to those skilled in the art that various changes and modifications may be made without departing from the spirit of the invention or from the scope of the appended claims.

What is claimed is:

1. A vehicle comprising a hollow body of truncated cone formed to define an interior space, with an opening at the bottom; a plurality of travelling wheels suspended on said body; a labyrinth packing extending downwardly from the bottom peripheral edge of said body to near the surface over which the vehicle travels so as to serve the packing function in cooperation therewith; wheel drive means for driving at least one of said travelling wheels; a fan having a suction port opening into said body and a delivery port opening to the atmosphere and operable to reduce the air pressure in said body; and fan drive means for driving said fan whereby said vehicle can travel freely over a surface with said body held drawn against the surface.

2. A vehicle as set forth in claim 1, in which said wheel drive means, said fan and said fan drive means are arranged in the central region of said body.

3. A vehicle as set forth in claim 1, in which either or both of said wheel drive means and fan drive means are arranged separate from said body for operation under remote control.

4. A vehicle as set forth in claim 1, in which a fan unit including at least said fan and drive means therefor is arranged separate from said body and a flexible, extensible air duct is provided to connect the suction port of said fan with the interior of said body for fluid communication therewith.

* * * * *